United States Patent [19]
Cordonnier

[11] Patent Number: 5,519,917
[45] Date of Patent: May 28, 1996

[54] MOUNTING DEVICE FOR A FRONT MOUNTED REMOVABLE HANDLE AND THE LIKE

[75] Inventor: Carl J. Cordonnier, Lapeer, Mich.

[73] Assignee: Cambridge Industries, Inc., Madison Heights, Mich.

[21] Appl. No.: 286,542

[22] Filed: Aug. 5, 1994

[51] Int. Cl.⁶ .................. A47J 45/00; B60J 5/00
[52] U.S. Cl. .......... 16/110 R; 16/114; 16/DIG. 24; 49/460
[58] Field of Search .................. 16/114, 110 R, 16/DIG. 24, 125; 403/9, 209, 215; 292/42.2, 52, 162, 340, 357; 296/71; 49/460, 502

[56] References Cited

U.S. PATENT DOCUMENTS

| | | |
|---|---|---|
| 1,087,103 | 2/1914 | Black . |
| 1,671,328 | 5/1928 | Sturn et al. . |
| 2,001,666 | 5/1935 | Keil . |
| 2,086,489 | 7/1937 | Bowersox . |
| 2,142,953 | 1/1939 | Raymond . |
| 2,537,750 | 1/1951 | Gretschel . |
| 3,412,422 | 11/1968 | Champlin . |
| 3,621,510 | 7/1970 | Rollins, Jr. . |
| 4,123,821 | 11/1978 | Brown .................. 16/114 R |
| 4,404,709 | 9/1983 | Janz et al. . |
| 4,582,443 | 4/1986 | Hegele .................. 16/114 R |
| 4,664,165 | 5/1987 | Pollak et al. . |
| 4,862,642 | 9/1989 | Alessi . |
| 4,912,808 | 4/1990 | Blakely .............. 16/DIG. 24 |
| 4,949,508 | 8/1990 | Elton . |

FOREIGN PATENT DOCUMENTS 2428540  2/1980  France .............. 16/DIG. 24

Primary Examiner—W. Donald Bray
Attorney, Agent, or Firm—Reising, Ethington, Barnard & Perry

[57] ABSTRACT

A handle (12) mounted to a support bracket (34) underlying a headliner (10) through two mounting devices (11). Each mounting device (11) includes a T-shaped end section (24) of a U-shaped spring metal strap (22) of the handle having a T-end that engages a T-shaped aperture in the support bracket (34). The body (20) of the handle includes a tab (23) that extends beyond end 51 of the body (20) and into the T-shaped aperture to abut an abutment shoulder (44) adjacent the T-shaped aperture in order to interlock with the T-shaped end section (24) of the strap. The tab (23) is removable from the aperture (40) and disengageable from the abutment shoulder (44) to allow the handle to be removable from the bracket (34).

23 Claims, 2 Drawing Sheets

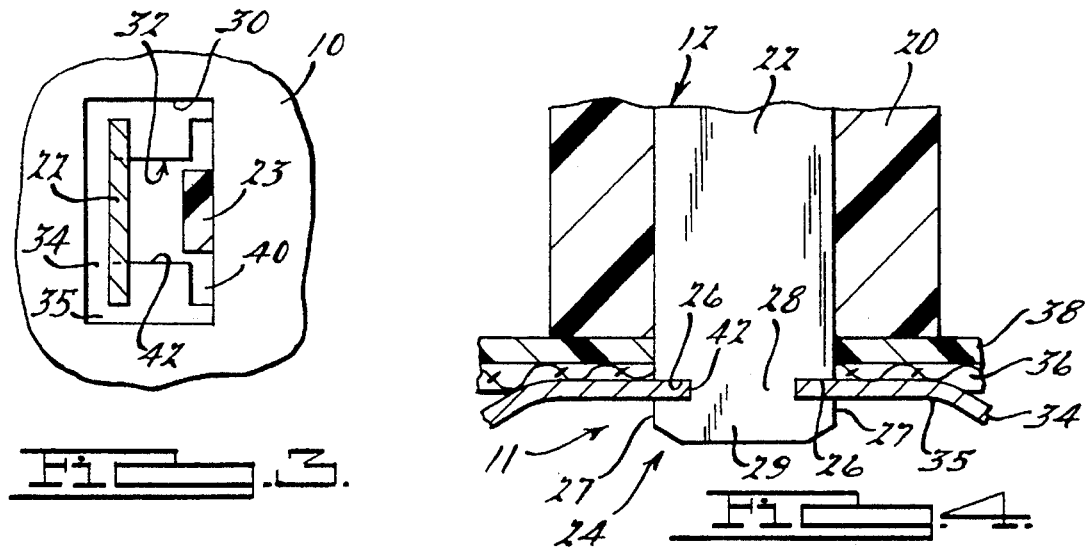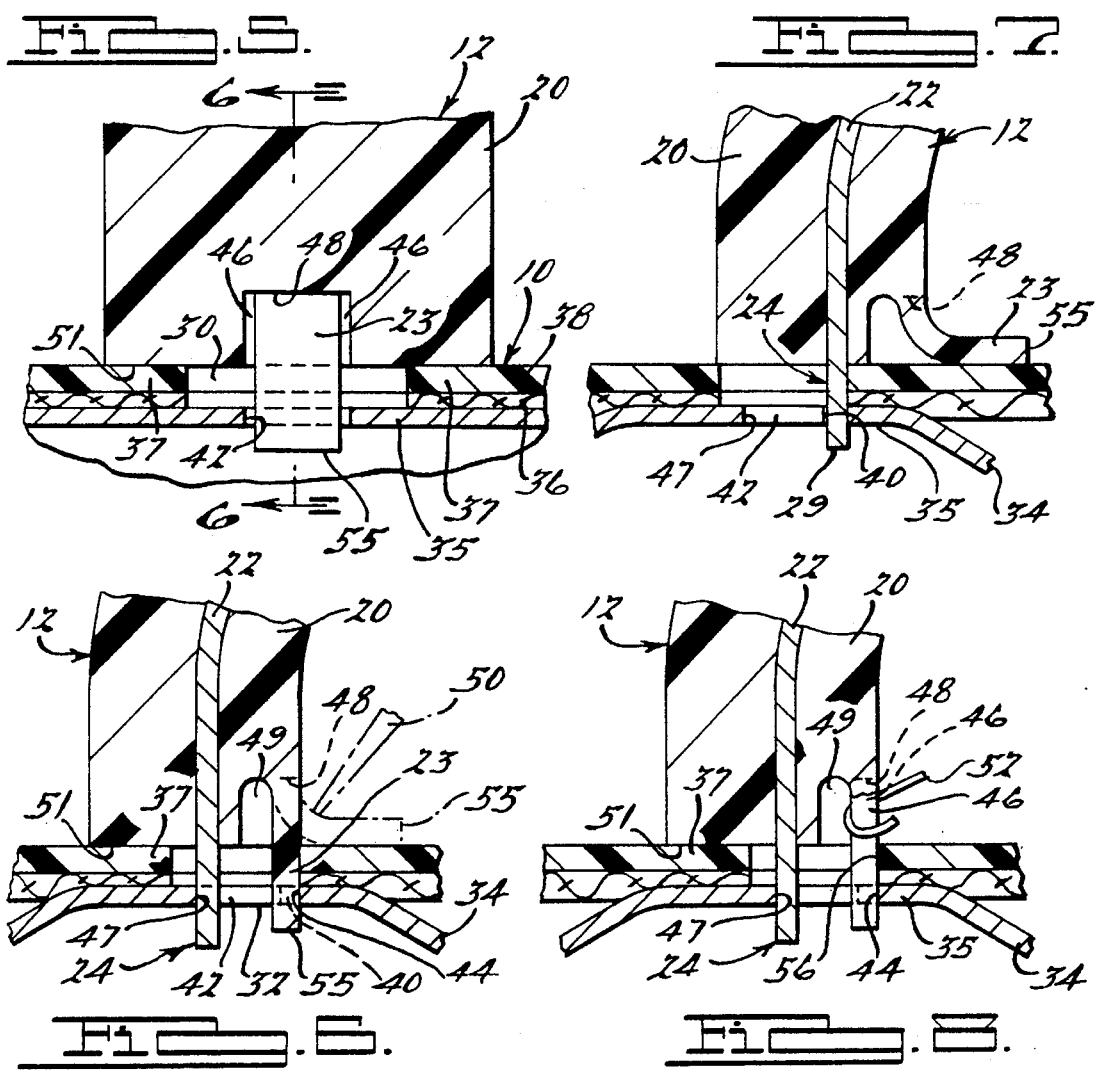

MOUNTING DEVICE FOR A FRONT MOUNTED REMOVABLE HANDLE AND THE LIKE

TECHNICAL FIELD

The field of this invention relates to a mounting mechanism for mounting a handle arm rest or like part to an interior support bracket of a motor vehicle or the like.

BACKGROUND OF THE DISCLOSURE

Pull handles and arm rests have been mounted onto the interior of motor vehicles to allow people to pull doors closed, to push themselves up, to pull themselves up or to gently let themselves down. Consequently, the handles must be strong enough to resist substantial pushing and pulling forces and repeatedly support the body weight of a person. Furthermore the handles must be rigidly affixed and resistant against rattling or rocking forces.

Handles have often been screwed into support brackets. However the screw heads are often considered unsightly and the screws themselves present an added part than may be loosened and cause rattling. As such, the screw heads have often been recessed and concealed under cosmetic buttons that cover the recess hole. Often the cosmetic button needs to be removed with an Allen wrench or other special tool which provides an additional security device that deters unwanted or unintentional access to the screw and unwanted loosening or removal of the handle. Furthermore, the screw thread needs to be threaded into a lock tight washer which assures that the screw remains tight against jostling and vibrations that may otherwise loosen it. These added features also present still additional parts that add to the expense of manufacture and assembly of the motor vehicle.

Hidden screws that mount the handle from the back of the garnish molding are unacceptable since the screw head becomes inaccessible when the interior trim of the vehicle is fully assembled. Permanent snap fittings are known but are also considered undesirable since the snap fit device similarly prevents removal of the handle without access to the rear of the interior trim if a repair or replacement is needed.

Other front mounted detachable handles are known and used for suitcases and the like that allow the handle to be detachable but provide no deterrence against accidental or undesirable removal.

Automotive designs are tending to use less parts. Methods to eliminate interior trim moldings that are used to mount an interior headliner at the side edges thereof are being developed. In order to eliminate the mounting function of the trim molding, the headliner needs to be mounted by another otherwise functional part. A pull handle can be a suitable alternative if it can be properly and removably affixed from the front.

What is needed is a mounting mechanism that provides for front mounted handle onto a support bracket of automotive interior trim while providing a deterrence against unintentional removal of the handle.

SUMMARY OF THE DISCLOSURE

In accordance with one aspect of the invention, a handle assembly that includes a support bracket and a garnish molding such as a headliner or door panel overlying the support bracket. The garnish molding and support bracket each have a pair of apertures with a respective aperture in the support bracket at least partially aligned with the aperture through the molding.

A handle member includes an exterior body section and an inner frame member having a center section and two end sections. Preferably the frame member is a U-shaped strap of spring metal. An exterior body is preferably made from a flexible and resilient plastic such as polyvinylchloride molded about the center of the strap. The two end sections of the spring metal strap extend out of the body section. Each of the end sections have a notch therein for allowing the end section to laterally extend through an aperture in an underlying support bracket and be laterally movable therein between a first position that provides axial disengagement and a second position that axially interlocks the end section via the notches. Preferably, each side edge of the spring metal strap has a notch formed therein to form a T-end. The notches are dimensioned to match the thickness of the support bracket to snugly receive the support bracket. The snug fit prevents the handle from rocking about a longitudinal axis along the plane of the garnish molding.

The exterior body has a tab section extending therefrom to be adjacent to an abutment shoulder in one of the support bracket or an interposed garnish molding that conceals the support bracket. The garnish molding may be a headliner overlying the support bracket. The tab retains the handle frame member end in the second position against lateral movement toward the first position. The tab section is flexible to allow it be pried away from the abutment shoulder to allow the frame member end to move laterally toward its first position. The handle with its resilient exterior body and spring metal strap allows the handle to flex sufficiently to allow each end of the strap to move to the first position. Preferably the abutment shoulder is formed by an inner edge of the aperture of the support bracket. A hook tool may be used to pry the tab out of the aperture.

The tab preferably is integrally formed with the body and is made of the same flexible and resilient plastic material. The tab has a proximate end integrally blended into the body located above the aperture in the molding. A hollow recess is desirably formed directly behind the tab. It is desirable that the hollow recess has a depth at least as great as the thickness of the tab. A slot is preferably formed between each side of the tab and the end of the resilient body and extends toward the proximate end of the tab that is integral with the body. The slot provides access of the blade instrument therethrough and into the recess behind the slot. The tab has a distal end extending beyond the body end and is substantially parallel to the end section of the spring metal strap.

In one embodiment, the aperture in the support bracket is a T-shaped opening with a wide part, i.e. the top of the T, aligned with to the first position of the end of said frame member. The T-shaped aperture is sized to axially receive the strap and the narrow leg portion of the T-shaped aperture is sized to laterally engage the T-end of the strap. The wide part of the T-shaped opening is aligned adjacent the inner edge of a respective aperture in the garnish molding.

In accordance with another aspect of the invention, the invention relates to the part member adapted to fit within a support base as above described.

BRIEF DESCRIPTION OF THE DRAWINGS

Reference now is made to the accompanying drawings in which:

FIG. 3 is cross sectional view taken along lines 3—3 shown in FIG. 2;

FIG. 4 is a cross sectional view taken along lines 4—4 shown in FIG. 2;

FIG. 5 is a cross sectional view taken along lines 5—5 shown in FIG. 2;

FIG. 6 is a cross-sectional view taken along lines 6—6 shown in FIG. 5;

FIG. 7 is a view similar to FIG. 6 illustrating the handle in the process of being installed; FIG. 8 is a view similar to FIG. 6 illustrating the handle in the process of being disassembled; and FIG. 8 is a fragmentary side elevational view of the handle illustrating the tab and strap end shown in FIG. 2.

DETAILED DESCRIPTION OF THE PREFERRED EMBODIMENT

Figure 1:
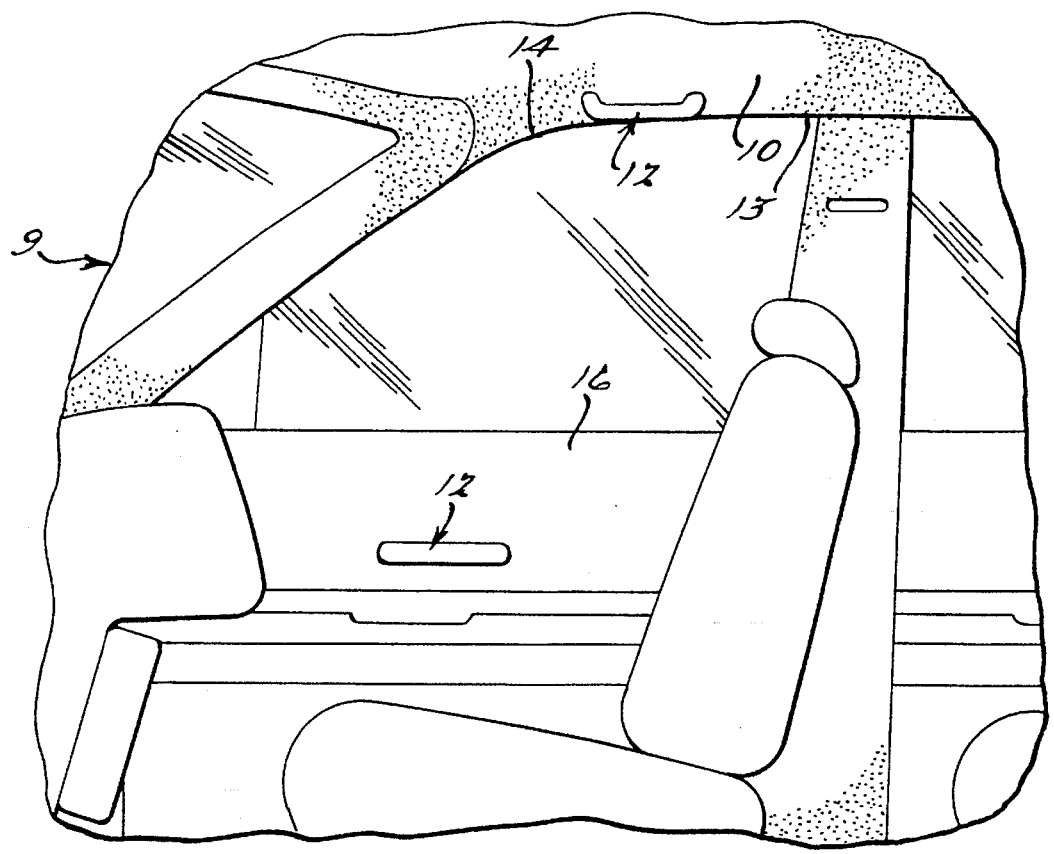
FIG. 1 is a perspective view of support handles assembled to automotive interior trim in accordance with one embodiment of the invention.

Referring now to FIG. 1, an automotive interior 9 has an interior headliner 10 with a support handle 12 mounted in proximity to its side edges 13 that extends to the upper edge of the door entry 14. Another identical handle 12 may also be mounted on a door panel 16. The handle 12 may also be mounted on other garnish moldings overlying appropriate support brackets at other locations where a pull handle is desirable.

Figure 2:
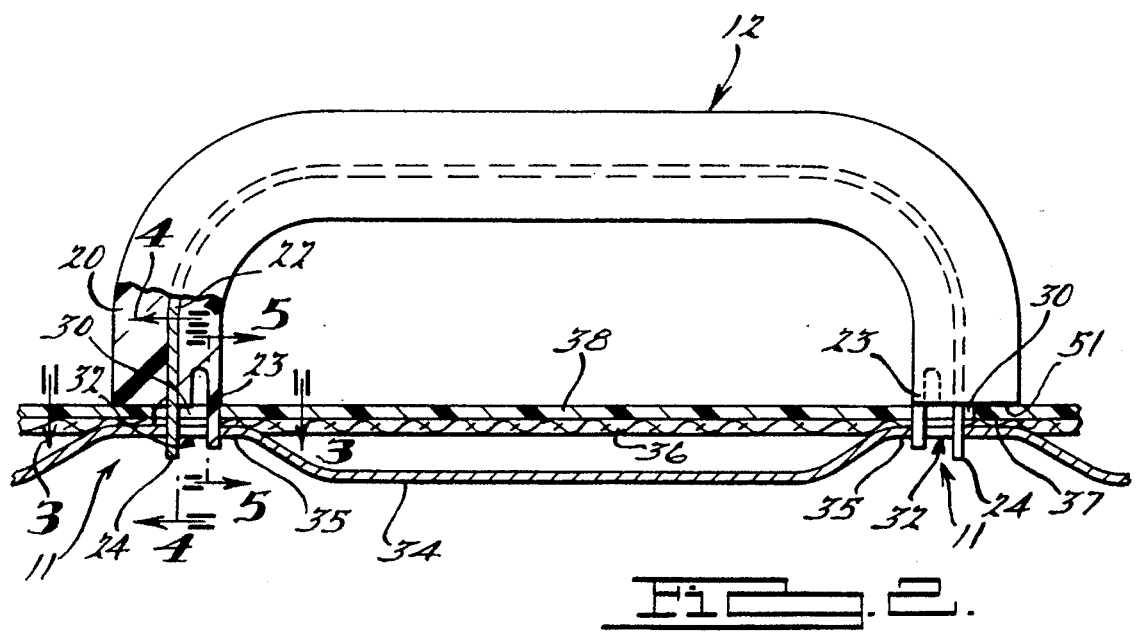
FIG. 2 is partially segmented and enlarged view of the handle shown in FIG. 1.

Referring now to FIGS. 2 and 8, the handle 12 is rigidly connected to a support bracket 34 at its opposite ends via two identical mounting mechanisms generally indicated as 11. The handle 12 includes a molded polyvinylchloride (pvc) material 20 that is molded about a spring steel strap 22. The molded pvc material has an integrally formed flexible tab 23 extending downward therefrom. The spring steel strap has two exposed end sections 24 that extend through apertures 30 and 32 through headliner 10 and the underlying support bracket 34.

Support bracket 34 is preferably sheet steel that is welded or otherwise rigidly secured to the automotive body in a conventional fashion. The support bracket 34 may be spaced from the headliner 10 but has two raised sections 35 that are aligned under apertures 30 and abut the underside of liner 10. The apertures 32 are through the raised sections 35. The headliner 10 may have a plurality of layers 36 and 38. Layer 38 may be a textured plastic or cloth. Layer 36 may be a compressible foam liner. Other materials such as wood pulp or Celatex may also be suitable.

As illustrated more clearly in FIGS. 3 and 4, each end section 24 of the strap 22 commonly referred to as a T-end has opposing aligned notches 26 in opposite side edges 27 to form a smaller dimensioned section 28 and a wider distal end 29. The T-end 24 extends through the aperture 30 such that wider end 29 is interlocked through the aperture 32 in the support bracket. The aperture 32 is T-shaped with an outer wide section 40, i.e. the top of the T, that is sized to receive the end 29 of strap 22 and a narrow section 42, i.e. the leg of the T, that is sized to snugly and laterally receive narrow section 28 of the strap 22 between the notches 26. The support bracket section 35 has a thickness sized to snugly fit within notches 26 when the narrow section 28 is snugly received within section 42. The snug fit of the T-end 24 in the T-shaped aperture 32 provides for a rigidly affixed mount 11 that reduces lateral rocking of the handle about an axis passing through the two mounting devices 11. Both ends 29 of strap 22 abuts the outer edge 47 of the aperture in a slightly flexed position to maintain a resilient bias against both edges 47 to further reduce any rattling of the installed handle 12.

As more clearly illustrated in FIGS. 5 and 6, the flexible tab 23 extends through aperture 30 and into aperture 32 adjacent abutment shoulder 44 in aperture 32 and abutment shoulder 56 in aperture 30. The tab 23 extends above the headliner 10 such that two slots 46 are formed between the tab 23 and the rest of the pvc molded material 20. The tab 23 is integrally joined with the material 20 at its top edge 48. A recess 49 is formed behind the tab 23 and is as wide as the tab 23 and slots 46. The recess 49 has a depth as great as the thickness of the tab 23 to allow the tab to be folded upon itself or doubled up as described in more detail below.

The presence of tab 23 within aperture 32 prevents the T-end 29 of strap 22 from laterally moving to the aligned position with wide section 40 of aperture 32 as illustrated in FIGS. 3 and 6. In this fashion the end 29 is locked within narrow section 42. The length of the strap end 24 and the thickness of the headliner 10 are such that when the handle is engaged as shown in FIGS. 1 and 2, the headliner 10 has interposed sections 37 press fitted between the ends 51 of molded pvc material 20 and the embossed sections 35 of the support bracket 34.

The operation of installing and removing the handle 12 are relatively easy via the use of some relatively simple tools. As shown in FIG. 6, in order to mount the handle, the operator flexes the handle slightly inward such that the strap 22 has both ends 29 aligned directly above the wide portion 40 of each aperture 32. The handle is then lowered such that the ends 29 are then inserted through the apertures 30 and into the wide apertures sections 40. At this point as shown in FIG. 7, the tab 23 is being flexed against the headliner 10. The underlying raised section 35 provides sufficient support for the headliner 10 against the biasing force of the flexed tab 23.

The strap 22 is then allowed to flex outwardly toward its natural state thereby moving notched section 28 snugly into small section 42 of aperture 32 such that it abuts against outer edge 47 of aperture 32 as shown in FIG. 6. The tab 23 is still flexed and abuts the outside surface of the headliner 10 as shown in phantom in FIG. 6. The tab is then pushed into its installed position by an appropriate tool 50 such as a small screw driver or blade. The recess 49 allows the tab 23 to flex inward and allows its distal end 55 to flex and double up as the blade progressively pushes the tab 23 into the apertures 30 and aperture 32. At this point, the tab 23 resiliently straightens out and extends downward in the engaged position and the handle is completely installed.

The handle 12 may be disengaged and removed with the use of hook tool 52 as shown in FIG. 8 and reversing the steps described above. The hook 52 is inserted through one of the slots 46 and projects into the recess 49 behind tab 23. The hook 52 is then pulled to remove the tab from the apertures 30 and 32. Once the tab 23 is removed from apertures 30 and 32 such that it is disengaged from abutment shoulders 44 and 56, as shown in phantom in FIG. 6, the handle strap 22 is then flexed inwardly to align the T-end 29 with the wide section 40 of aperture 32 as shown in FIG. 7. The end 29 can then be withdrawn to disengage the handle 12 from the bracket 34.

When installed, the handle is rigidly secured to the bracket and locked in place and is resistant to accidental or undesirable disengagement from the bracket 34. If the tab 23 is in place within the apertures 30 and 32 and against shoulders 44 and 56, the maximum motion that the handle strap 22 may undergo is the depth of the recess 49. The tab 23 positively blocks any further motion of the strap 22 and maintains the strap 22 within small section 42 of the aperture 32 and interlocked therewith.

The handle may be cosmetically attractive. The molded pvc exterior may have a wide variety of color and textures. The mounting mechanism 11 is substantially concealed. The slots 46 may be thin and relatively inconspicuous. The slots 46 are also unobtrusive by being positioned on the interior facing section 53 of the handle allowing the exterior facing section 55 to remain free from exposed screws or other mounting devices.

It can be readily seen that the handle may be mounted to an exposed support bracket 34 without the interposed headliner 10. If so, the ends 51 of the body abut the support bracket sections 35 directly and the ends 29 have the appropriate length adjustment to engage the apertures 32. The tab 23 extends directly into the aperture 32 and engages shoulder 44. When the headliner 10 is made from sufficiently strong and rigid material, the tab 23 may be shortened such that it extends only into aperture 30 and abuts only shoulder 56 thereof. Functionally, the shoulder 56 of aperture 30 is identical to shoulder 44 of aperture 32 and may for functional purposes be considered as the same front edge of a single aperture.

As shown, the handle 12 may be installed or removed without disturbing the headliner 12. The tool usage is in front of the headliner 10. Tool access behind the headliner is not necessary to either install the handle or remove the handle. The handle, once installed, is resistant to casual or accidental removal. It is also resistant to rattling or rocking motion. The handle, once installed, also functions as a mount for the headliner or other garnish molding.

Other variations and modifications are possible without departing from the scope and spirit of the present invention as defined by the appended claims.

The embodiments in which an exclusive property or privilege is claimed are defined as follows:

1. A support handle for an automotive interior, said handle characterized by:
   a resiliently flexible body;
   an inner frame member having a center section and two end sections;
   said center section of said inner frame being embedded in said body;
   said two end sections of said frame member extending out of respective ends of said body;
   each of said end sections having a notch therein for allowing said end section to extend through an aperture in an connectable support bracket thereunder and be laterally movable therein between a first position that allows axial disengagement and a second position that prevents axial disengagement;
   said body having a tab section extending therefrom;
   an abutment shoulder spaced from said end section and abuttable against said tab section to retain said handle frame member end in said second position against movement toward said first position;
   said tab section being flexible to allow it be pried upward and disengaged from said abutment shoulder to allow said frame member end to move laterally into said first position to allow disengagement of said handle from said support bracket.

2. A support handle as defined in claim 1 further characterized by:
   said tab having a proximate end positioned above said abutment shoulder and integrally formed with the resilient flexible body;
   a hollow recess formed in said end of said body behind said tab;
   a slot formed between each side of said tab and said body and extending to the proximate end of said tab with said body to provide access of a blade instrument into said slot and intrude into said recess and pull said tab away from said abutment shoulder.

3. A support handle as defined in claim 2 further characterized by:
   said hollow recess having a thickness at least as great as the thickness of the tab.

4. A support handle as defined in claim 3 further characterized by:
   said frame member being a strap of spring metal with opposing notches formed in opposite side edges of said end sections.

5. A support handle as defined in claim 4 further characterized by:
   said aperture in said support being a T-shaped opening with a wide part of said T-shaped opening corresponding to said first position of said end of said frame member.

6. A support handle as defined in claim 5 further characterized by:
   a garnish molding interposed between said support bracket and said handle;
   said wide part of said T-shaped opening aligned adjacent the inner edge of a respective aperture in said molding.

7. A support handle as defined in claim 6 further characterized by:
   said tab being long enough to extend into the wide portion of said T-shaped opening.

8. A support handle as defined in claim 2 further characterized by:
   said frame member being a strap of spring metal with opposing notches formed in the opposite side edges of said end sections.

9. A support handle assembly for an automotive interior, said handle assembly characterized by:
   a garnish molding having two spaced apertures therethrough;
   a support bracket underlying said garnish molding and having a respective aperture therethrough at least partially aligned with a respective aperture of said garnish molding;
   a handle including an inner frame member having a center section and two end sections and a resiliently compressible body;
   said center section of said inner frame being imbedded in said body;
   said two end sections of said frame member extending out of said body;
   each of said end sections having a notch therein for allowing said end section to extend through a respective aperture in said support bracket and be laterally movable therein between a first position that allows axial engagement and disengagement and a second position that prevents axial disengagement;
   said body having a tab section extending therefrom and extendible into a respective aperture of said garnish molding and abutting a shoulder at an edge thereof to retain said handle frame member end in said second position and prevents said frame member from moving into said first position;

said tab section being flexible to allow it be pried out of respective aperture in said garnish molding and disengaged from said shoulder to allow said frame member end to move to said first position.

10. A handle assembly as defined in claim 9 further characterized by:

said tab having a proximate end integrally formed with said body and positioned above said aperture in said molding;

a hollow recess formed in said end of said body behind said tab;

a slot formed between each side of said tab and said body and extending to the proximate end of said tab with said body to provide access of a tool into said slot such that said tool can intrude into said recess and pull said tab up out of said aperture of said garnish molding and disengage it from said abutment shoulder.

11. A handle assembly as defined in claim 10 further characterized by:

said hollow recess having a thickness at least as great as the thickness of the tab.

12. A handle assembly as defined in claim 11 further characterized by:

said frame member being a strap of spring metal with opposing notches formed in opposite side edges of said end sections.

13. A handle assembly as defined in claim 12 further characterized by:

said aperture in said support being a T-shaped opening with a wide part of said T-shaped opening corresponding to said first position of said end of said frame member.

14. A handle assembly as defined in claim 13 further characterized by:

said wide part of said T-shaped opening aligned adjacent the inner edge of a respective aperture in said molding.

15. A handle assembly as defined in claim 14 further characterized by:

said tab being long enough to extend through the aperture in said molding and into the wide portion of said T-shaped opening.

16. A handle assembly as defined in claim 10 further characterized by:

said frame member being a strap of spring metal with notches formed in the side edges of said end sections.

17. A mounting mechanism for mounting a part to a support base, said mechanism characterized by:

said part including a resiliently flexible body;

an inner frame member having a section embedded in said body and an end section extending therefrom;

said end section having a notch therein for allowing said end section to extend through an aperture in said base and be laterally movable therein between a first position that allows axial disengagement and a second position that prevents axial disengagement;

said body having a tab section extending therefrom;

an abutment shoulder spaced from said end section and abuttable against said tab section to retain said frame member end in said second position against movement toward said first position;

said tab section being flexible to allow it be pried upward and disengaged from said abutment shoulder to allow said frame member end to move laterally into said first position to allow disengagement of said part from said base.

18. A mounting mechanism as defined in claim 17 further characterized by:

said tab having a proximate end positioned above said abutment shoulder and integrally formed with the resilient flexible body;

a hollow recess formed in said end of said body behind said tab;

a slot formed between each side of said tab and said body and extending to the proximate end of said tab with said body to provide access of a blade instrument into said slot and intrude into said recess and pull said tab away from said abutment shoulder.

19. A mounting mechanism as defined in claim 18 further characterized by:

said hollow recess having a thickness at least as great as the thickness of the tab.

20. A mounting mechanism as defined in claim 19 further characterized by:

said frame member being a strap of metal with notches formed in the opposite side edges of said end section.

21. A mounting mechanism as defined in claim 20 further characterized by:

said aperture in said support being a T-shaped opening with a wide part of said T-shaped opening corresponding to said first position of said end of said strap.

22. A mounting mechanism as defined in claim 21 further characterized by:

a garnish molding interposed between said base and said part;

said wide part of said T-shaped opening directly aligned with an inner edge of a respective aperture in said molding.

23. A mounting mechanism as defined in claim 22 further characterized by:

said tab being long enough to extend into the wide portion of said T-shaped opening.

* * * * *